Figure 1:
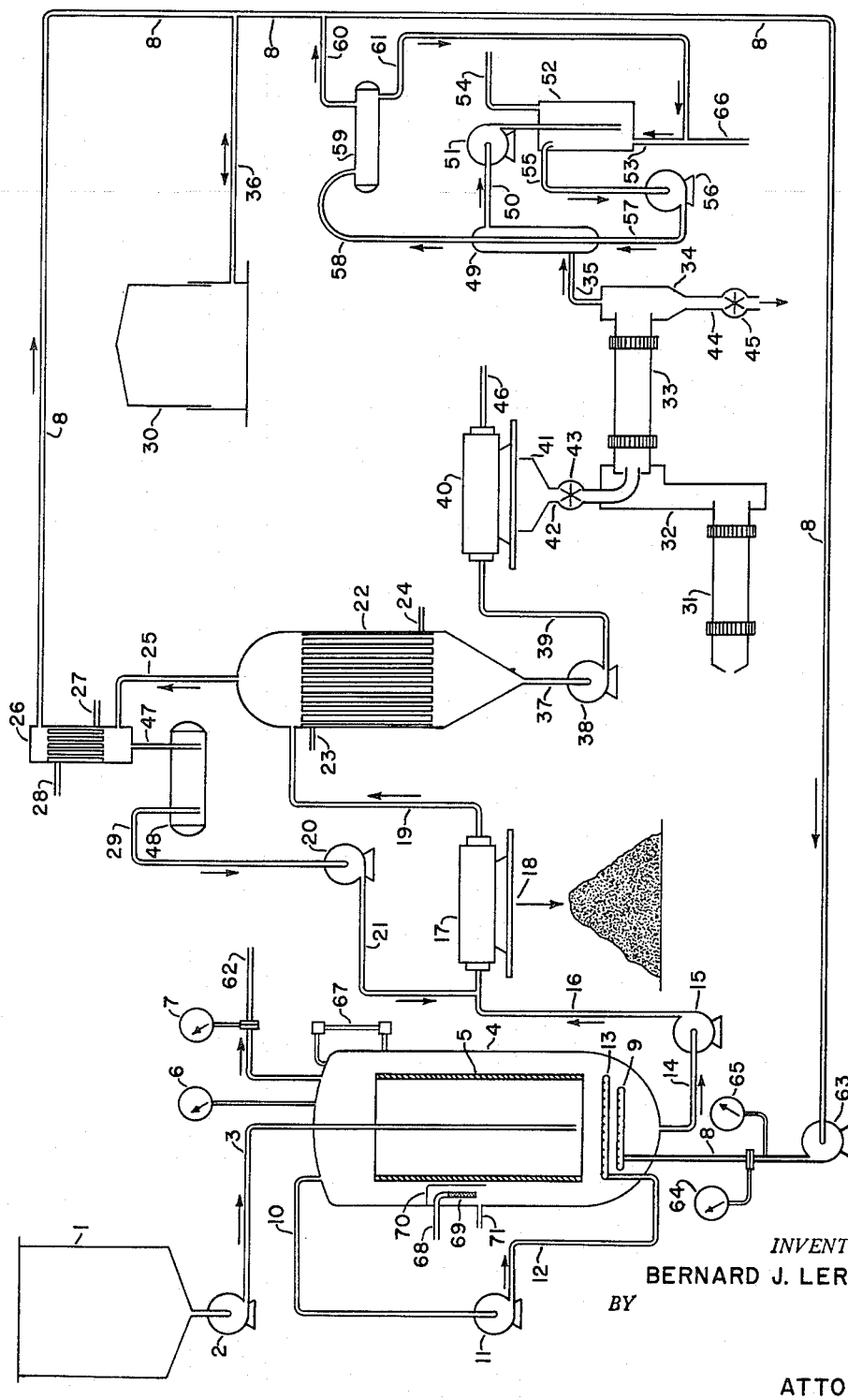

March 13, 1962

B. J. LERNER 3,025,131

PROCESS FOR THE REMOVAL OF CARBONATES
FROM CARBONATE-CONTAINING ORES

Filed Sept. 11, 1958

2 Sheets-Sheet 1

INVENTOR.
BERNARD J. LERNER
BY

ATTORNEY

INVENTOR.
BERNARD J. LERNER

This invention relates to process, and more particularly to a treatment process for removal of carbonates of calcium and other carbonates from ores by means of sulfur dioxide wherein the ore is reduced to finely divided form and is digested with sulfur dioxide supplied at a measured rate, wherein the rate of generation of gas, mostly carbon dioxide, is measured, and wherein this treatment is terminated when the rate of generation of gas falls away rapidly in proportion to the rate of supply of sulfur dioxide.

Calcite and other carbonates are found in substantial proportion in many ores and the economical removal of these carbonates is often a highly desirable approach for "opening up" the ore and facilitating access to its more valuable mineral content. The use of hydrochloric acid for this purpose is well known but this operation is needlessly costly in most instances and it often entails the undesirable result of putting some components of the ore in solution at a stage when they could be more advantageously processed otherwise. The use of sulfuric acid for the purpose is likewise undesirable in that it promptly enshrouds the ore particles with a covering of insoluble and cementitious calcium sulfate and interferes with further reaction with all components of the ore, including the carbonates.

In the case of ores containing anywhere from a fraction of one percent up to several percent of the desired mineral and containing high proportions of calcite and other carbonates, the cost of the removal of the carbonates is often the deciding factor in determining whether or not an ore is of any economic value. This is true to an unusually great degree in the case of columbium ores and uranium ores, which often contain relatively small fractions of one percent of the desired metal together with as much as 50 percent or more of carbonates. Removing the calcite in such cases by the means known to the prior art is ordinarily prohibitive. I have invented a process for removal of calcite and other carbonates with sulfur dioxide which can be conducted at much lower cost than is the case with the use of hydrochloric acid or other conventional means. The outstanding features of my process are simplicity and certainty in supplying the requisite quantity of sulfur dioxide to a digestion chamber without using any substantial excess of reactant.

Specifically, in the conduct of my process I charge a slurry of finely divided ore and water into a digestion chamber, introduce sulfur dioxide at a measured rate, measure the rate of generation of off-gas, continue the introduction of sulfur dioxide until the ratio of the carbon dioxide output to $SO_2$ input falls to a point approaching half of its maximum value, and then discontinue the introduction of sulfur dioxide.

Figure 2:
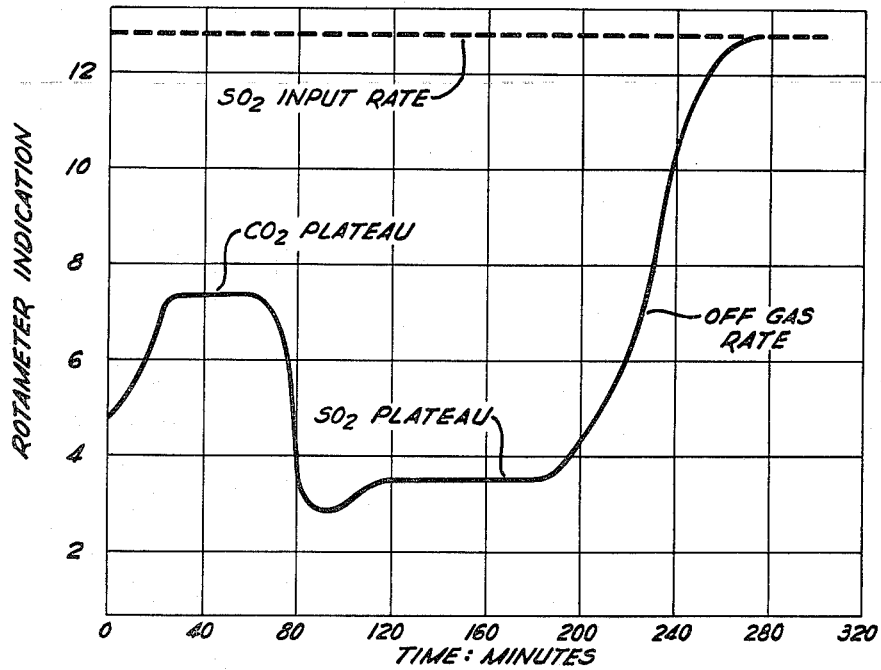

The process will be described in greater detail in connection with the following description of the accompanying drawings, wherein FIGURE 1 is a diagrammatic flow chart of an ore treating process involving the generation of sulfur dioxide, the pretreatment of the ore therewith, and the recovery and recycling of sulfur dioxide, all in the manner claimed in this application, and FIGURE 2 is a curve in which the rate of introduction of sulfur dioxide and the rate of generation of off-gas are plotted against time.

Referring to FIGURE 1, a slurry of finely ground ore in water is forced by slurry pump 2 from tank 1 through conduit 3 into digester 4. Digester 4 is a closed chamber with a draft tube 5 positioned concentric with the outer walls of the digester. Since the purpose of a draft tube is to permit circulation of the contents of the chamber upward inside of the tube and then downward in space between the outer wall of the draft tube and the inside wall of the digester chamber, the draft tube does not extend either to the bottom of the chamber or, at its upper end, quite to the level at which liquid will be maintained in the digester. In the conduct of the process herein disclosed and claimed, it is desired to measure the rate of gas generation in the digester and therefore digester 4 is fitted with pressure gauge 6 and a flow meter 7 to measure the rate at which off-gas leaves the digester through conduit 62. It is always desirable to operate with as small a gas space as possible above the liquid in digester 4, as this will permit maximum accuracy in determining the current rate of generation of off-gas. With the aid of pump 63 sulfur dioxide, either in gaseous form or in solution in water, is introduced into digester 4 from conduit 8 through sparge 9. It is also desired to measure the rate at which $SO_2$ is introduced into the digester 4 through conduit 8 and sparge 9, and for this purpose a flow meter 64 and pressure gauge 65 are placed in conduit 8 close to the point of discharge into digester 4. It is desirable, at least during portions of the process, to have positive means for circulation of the slurry in digester 4, and for this purpose provision is made to remove gas from the top of digester 4 through conduit 10 and return it to the bottom of the digester by means of blower 11, conduit 12 and sparge 13.

A sight gauge 67 is provided to permit observation of the level of the material in digester 4. This digester is also provided with a draw-off line 68, fitted with a screened intake 69. A shield 70 positioned about screened intake 69 and at some distance therefrom helps to keep ore particles from being withdrawn through draw-off line 68. This draw-off line is used when practicing this invention by introducing sulfur dioxide into digester 4 in the form of a water solution of $SO_2$, as will be later described. A sampling connection 71 provides for the withdrawal of test samples from digester 4.

In the conduct of this process with gaseous sulfur dioxide digested slurry leaves the bottom of digester 4 through conduit 14 and is forced by slurry pump 15 through conduit 16 to filter 17. Solids separated by filter 17 are discharged therefrom at 18, and the filtrate from filter 17 is discharged therefrom through conduit 19 into evaporator 22. Steam, either superheated or otherwise, as the process may require, is supplied to evaporator 22 through conduit 23 and discharges through conduit 24. Sulfur dioxide vapors leave the top of evaporator 22 through conduit 25 and are conducted to condenser 26. Cooling fluid is supplied to condenser 26 through conduit 27 and is conveyed away therefrom through conduit 28. Liquid condensate from condenser 26 passes from the bottom of that condenser through conduit 47 into stock tank 48. From there it is conveyed through conduit 29, pump 20, and conduit 21 to the entrance of filter 17 for use as filter wash. Uncondensed sulfur dioxide is conveyed away from the top of condenser 26 through conduit 8 and there enters the $SO_2$ system.

Unvaporized material from evaporator 22 is conveyed therefrom through conduit 37 and forced by pump 38 through conduit 39 to the entrance of filter 40. Solids discharged from filter 40 are caught in bin 41 and pass through conduit 42 and star valve 43 into roasting kiln 33. The roasted solids discharge from kiln 33 into separating chamber 34 and pass through a conduit 44, controlled by star valve 45, for further use. Provision is made for the maintenance of a sufficient mass of solids above star valves 43 and 45 to keep these valves sealed at all times.

Filtrate from filter 40 leaves that filter through conduit 46 for further processing.

Sulfur dioxide for use in digester 4 is originally generated by a sulfur burner 31 and the $SO_2$ vapors there generated advantageously pass therefrom into flue 32 and are conveyed to roasting kiln 33 to provide necessary heat therein for the roasting of solids discharged from filter 40. These vapors, after giving up some of their heat in roasting kiln 33, pass into separating chamber 34 and therefrom through conduit 35 into heat exchanger 49. After giving up heat in heat exchanger 49, the $SO_2$ vapors pass through conduit 50 with the aid of blower 51 into absorber 52. Water is introduced into absorber 52 through line 53, and nitrogen is discharged therefrom through line 54. Water, together with its absorbed $SO_2$, is withdrawn from absorber 52 through conduit 55 and, with the aid of pump 56 it is forced through conduit 57, through heat exchanger 49 and conduit 58, into a separator 59. As a consequence of the heating in heat exchanger 49, sulfur dioxide vapors flash in separator 59 from unvaporized absorbent, the $SO_2$ vapors passing from the top thereof through conduit 60 into conduit 8 of the $SO_2$ system, and the unvaporized absorbent together with a small amount of absorbed $SO_2$ leaves the bottom of separator 59 through conduit 61. This unvaporized absorbent can advantageously be used as the water supply entering absorber 52 through conduit 53. In such case a conduit 66 is provided to furnish any make-up water that may be required and to conduct away any excess water.

The system depicted in FIGURE 1 is a batch process, and at times the $SO_2$ generated in sulfur burner 31, together with that recovered in evaporator 22 and roasting kiln 33 will be in excess of the momentary requirements of digester 4. Therefore a gas holder 30 is provided, communicating with conduit 8 of the sulfur dioxide system through conduit 36. In most instances several parallel lines of ore treating equipment will be operating, out of phase with one another, and the $SO_2$ generated in elements 31, 22, and 33 of one line will be used immediately in the digester 4 of a parallel line. Nevertheless, a gas holder 30 or equivalent is convenient. Or the excess $SO_2$ available at any time may be absorbed in water and subsequently vaporized therefrom as needed.

The sulfur dioxide system described above is highly economical and advantageous but the investment cost of an installation can be held down by introducing all of the unseparated stream of sulfur dioxide and nitrogen from sulfur burner 31, after cooling, into digester 4. However, this practice inflates the charge through sparge 9 and, equally, the off-gas discharge through conduit 62, with a considerable quantity of unreactive nitrogen. This results in no less of a drop in off-gas when the carbon dioxide end point is attained but it does somewhat reduce the ratio between the rate of charge through sparge 9 and the rate of off-gas discharge through conduit 62. However, the drop in ratio is still quite sharp and inescapable of notice either by an attendant or by available instrumentation.

Another means of introducing the sulfur dioxide into digester 4 is by absorbing it in water and introducing this water solution of sulfur dioxide into digester 4. In this mode of operation conduits 35 and 25 discharge directly into conduit 50, and conduit 57 discharges directly into digester 4 through conduit 8. Apparatus elements 49, 58, 59, 60, and 61 are eliminated in this mode of operation.

Although omitted from the drawing for purposes of simplification, valves are positioned on all conduits to control the passage of fluids therethrough.

Referring to FIGURE 2, this is a curve in which the rate of introduction of gaseous sulfur dioxide into the digester and the rate of discharge of carbon dioxide or other off-gas from the digester are plotted against time in minutes. The rate of introduction of $SO_2$ is shown by a dashed line which in this instance indicates a constant input at a Rotameter reading of slightly less than 13 units (12.8 to be exact). The rate of discharge of carbon dioxide together with any other incidentally-produced off-gas is shown by a solid line, forming a curve which is characteristic for the operation. The Rotameter indications in which flow is measured are in arbitrary units on a well known type of flow meter widely known and sold under the name "Rotameter." The precise value of the units is immaterial for our purpose, which latter is simply the determination of comparative rates of flow.

It will be seen from FIGURE 2 that a flow of gas resulted promptly upon the introduction of sulfur dioxide and that the rate of flow increased up to a maximum of approximately 7.3 units in twenty-five minutes, that the rate of flow of off-gas remained substantially uniform for thirty-five minutes thereafter, and that the rate of flow of off-gas then dropped sharply to a value approximately half of the maximum it attained during the interval between twenty-five and sixty minutes on the time scale of the curve. The latter, the period extending from twenty-five minutes to sixty minutes on the time scale of FIGURE 2 is what I call the $CO_2$ plateau and during this interval the carbonates react with the sulfur dioxide and $CO_2$ is discharged from conduit 62. During the steep downward slope of the curve at the termination of the $CO_2$ plateau, continued introduction and absorption of $SO_2$ causes the dissolved $CO_2$ to be discharged from the slurry. The introduction of sulfur dioxide is continued beyond this point. However, this continued supply of sulfur dioxide does not destroy further carbonates for there are no carbonates present as such at this point: rather the slurry absorbs the continuing feed of $SO_2$ through the interval of the curve indicated as the $SO_2$ plateau and then, as saturation with $SO_2$ approaches, the off-gas curve rapidly rises until, at full saturation, the off-gas curve levels off at a rate identical with the $SO_2$ input rate.

After the off-gas line on FIGURE 2 descends from the $CO_2$ plateau, the $CO_2$ content of the off-gas falls off rapidly and the $SO_2$ content of the gas builds up rapidly until the gas is 100 percent $SO_2$ at the point where the solid off-gas line meets the dashed $SO_2$ input line. The specific figures presented in FIGURE 2 were determined on a typical run, using a slurry in which the poundage ratio of water to ore was 3 to 1, and $SO_2$ was fed to this slurry at a rate of approximately one-tenth of a pound of sulfur dioxide per hour per pound of initial ore charge.

It will be seen from the foregoing that measurement of the comparative rates of $SO_2$ input and of off-gas generation permit an extremely convenient means of determining the point at which to discontinue feeding $SO_2$ when the object is the breaking down of carbonates in an ore. Of utmost importance is the fact that this method is of an adequate degree of accuracy for industrial operation and it is readily comprehended and practiced by the labor ordinarily available at remote mining locations.

A lengthy series of analyses have all indicated that the calcium carbonate is practically completely removed just prior to the $CO_2$ end point and that the resulting slurry has a pH value of 3 or higher at that point and is relatively non-corrosive. Apparently, at the $CO_2$ end point, the calcium is entirely in solution in spite of the fact that excess sulfurous acid is not present.

In the operation of my process a batch of slurry is prepared by introducing a charge of finely divided ore into slurry tank 1 in company with water, or this slurry may be a product of a prior processing step. A ratio of three pounds of water per pound of ore has been found to be a favorable proportion, although proportions as low as two pounds of water and as high as five pounds of water per pound of ore have been found to work satisfactorily. This slurry is then introduced into digester 4, which may be fitted with a mechanical stirrer or may be agitated by recirculation of gas from the top to the bottom by means of conduit 10, blower 11, conduit 12 and sparge 13. Regardless of the means used, agitation is desirable. At this point a stream of sulfur dioxide is introduced into the body of slurry in digester 4 through conduit 8 with the aid of blower or pump 63. Conduit 8, adjacent to digester 4, is fitted with a rate-of-flow indicating or recording device 64 and a pressure gauge 65. Digester 4 is also fitted with an off-gas discharge line 62 fitted with a rate-of-flow indicating or recording device 7 similar to 64. A pressure gauge 6 indicates the pressure of the gas in the top of digester 4 and the flow of off-gas through discharge line 62 is advantageously maintained free enough to create no appreciable pressure in the top of digester 4. This permits an immediate detection of change in the rate of generation of off-gas. The two rate-of-flow instruments 7 and 64 are calibrated to show corresponding figures for the same rate of flow after correcting for the necessary difference in pressure between the bottom and the top of digester 4.

It is always desirable to operate with as small a gas space as possible above the liquid in digester 4, as this will permit maximum accuracy in determining the current rate of generation of off-gas. Sight gauge 67 is provided to permit convenient observation and control of this level, or a liquid level controller can readily be installed to maintain the desired level.

Once the feeding of sulfur dioxide to digester 4 is commenced, there will be an almost immediate generation of gas and the flow then proceeds to increase to about its maximum. If the supply of sulfur dioxide is maintained uniform and the pressure on gauge 6 is maintained uniformly at a low figure, the rate of generation of carbon dioxide, as measured at the outlet of the digester, in conduit 62, will continue at an elevated and relatively uniform rate until the carbonates are practically completely removed. This does not mean that the rate of generation of off-gas will be precisely uniform, particularly if the rate of supply of sulfur dioxide is varied, but it does mean that the ratio of the rate of generation of carbon dioxide to the rate of supply of sulfur dioxide will be of about the same order until the carbon dioxide end point is reached. Thereupon the rate of generation of carbon dioxide will fall away rapidly as indicated in FIGURE 2, particularly in the portion of that curve between about 65 minutes and 80 minutes on the time scale of FIGURE 2. This falling away, which immediately follows attainment of the $CO_2$ end point, is so large and occurs in such a brief time interval that it cannot escape recognition. While several factors such as temperature and gas solubility may influence it in minor degree in particular instances, the rate of flow of off-gas after the carbon dioxide end point is reached will drop sharply to a far lower value. If the process has been operated as heretofore described with the sulfur dioxide in gaseous form or in solution in water, the drop in the rate of generation of off-gas at the time of attaining the carbon dioxide end point will be to a value generally of the order of half that which was attained during the carbon dioxide plateau. If the process has been operated, as it may be, on a stream of sulfur dioxide and nitrogen as produced directly by sulfur burner 31 (without passing through absorber 52, heat exchanger 49 and separator 59) the quantities of both the gas charged through sparge 9 and that discharged through conduit 62 will be increased by the volume of accompanying nitrogen, which does not enter into the reaction and leaves digester 4 in the same quantity in which it is introduced, and the effect of this will be that on attainment of the carbon dioxide end point the ratio of the rate of discharge of off-gas (as distinguished from the rate of generation of carbon dioxide) to the rate at which gas is introduced through sparge 9 will drop to a figure not so low as one-half but more nearly to eighty percent of the value of that ratio during the carbon dioxide plateau. The figure would not be quite so low as three-quarters if the gas fed to digester 4 was solely the output of sulfur burner 31 but the percentage $SO_2$ content of the gas fed to digester 4 is enhanced (and the percentage of nitrogen lowered) by the recyling of recovered sulfur dioxide from evaporator 22 and roaster 33. The precise values will not be critical because the sharp rate at which the ratio falls, and the sharp rate at which the production of off-gas falls, will be the means by which attainment of the carbon dioxide end point is determined and by which the time to shut off further supply of sulfur dioxide is determined. While the ratio of the rate of flow of off-gas to the rate of input of sulfur dioxide and any accompanying unreactive gas (e.g. nitrogen) is a figure that can be applied in all cases, this ratio can be overlooked so long as the input through sparge 9 is at a uniform rate. When this rate of input is uniform, as is the case in normal operation, all control can be by observation of the rate of flow of off-gas.

Reference has been made to the rapid falling away of the curve at the end of the carbon dioxide plateau, particularly in the portion of that curve between about 65 and 80 minutes on the time scale of FIGURE 2. It is to be emphasized that the specific figures of 65 minutes and 80 minutes apply solely to the specific but typical run plotted in FIGURE 2 and it is not intended to say that the falling away will in every instance occur in this specific time interval. The duration of the carbon dioxide plateau and the precise timing of the carbon dioxide end point depend on several variable factors such as the percentage of carbonate in the ore, the rate at which sulfur dioxide is fed to the digester, degree of agitation in the digester, temperature of the slurry, etc., but regardless of variations in the duration of the carbon dioxide plateau, the generation of gas will fall away sharply and promptly upon attainment of the carbon dioxide end point.

In view of the rapid and extensive drop in the rate of off-gas generation immediately upon attainment of the carbon dioxide end point it is a good practical means of recognition of the end point and a sound application of this invention to discontinue the feeding of sulfur dioxide to the reaction chamber when the ratio of the rate of generation of off-gas to the rate of introduction of sulfur dioxide has decreased to somewhere between approximately 80 percent and approximately 50 percent of the maximum rate attained during the carbon dioxide plateau.

The curve which constitutes FIGURE 2 of the accompanying drawings represents a specific but typical operation actually conducted over a period of time with a pyrochlore ore of which the following is a typical analysis:

| | Percent |
|---|---|
| Calcium carbonate | 9.5 |
| Iron | 11.82 |
| Fluorine | 0.10 |
| Columbium | 0.32 |

This ore is a pyroxenitic ore containing large amounts of acmite and augite type minerals with minor amounts of feldspar, wollastonite, biotite, quartz, apatite, and pyrochlore. It contains also trace amounts of zirconium, titanium, cerium, manganese, rare earths, uranium and thorium. The process has been used on and found to be equally well adapted to numerous other types of ore which contain substantial quantities of calcite or other carbonates, including uranium ores, columbite, samarskite, scheelite, spodumene, galena, wulfenite, chalcopyrite, and argentite. In processing these various ores it has been found that the time element has been comparable between them when their carbonate contents have been comparable, and the drop in rate of off-gas generation in proportion to the SO₂ feed rate has likewise been comparable.

The process which constitutes this invention does away with the common need in prior operations for repeated chemical analyses or the alternatives thereto which have been either the extravagant and wasteful overuse of sulfuric acid or the restricted and unguided use of hydrochloric or sulfuric acid in quantities inadequate to react with all the carbonates present in the ore. In any case, with the old sulfuric acid leaching process, the reaction produced an insoluble and cementitious calcium sulfate, while the process of this invention puts the reacted carbonates into solution, thereby permitting their ready removal from the more valuable components of the ore. The uncomplicated nature and the certainty of this invention permit its ready practice with a good degree of accuracy at mine locations by personnel who have not been educated in science and who are in many cases the only class of help available.

The slurry has been described as a slurry of finely divided ore in water. The degree of fineness may of course be quite variable, one-fiftieth of an inch being quite effective with some ores, one two-hundredth of an inch being more satisfactory in some, while others for instance may require crushing only to a size that will pass through a standard two mesh per inch testing screen. The actual fineness appropriate in any specific case depends primarily on the manner in which the carbonate is disseminated through the ore, as for instance sizeable crystals in some cases and extremely fine particles in others. Also, important factors in determining the particle size are the requirements of subsequent treatment and the rapidity with which it is desired to remove the carbonates. Summing up, the degree of fineness may be any degree from that passing a two mesh per inch screen on down to a very fine powder, depending primarily on the factors noted above, and when I speak in the appended claims of finely divided ore or of ore in a finely divided state I mean thereby that the ore be of a fineness of the order described in this paragraph.

So far the process of this invention has been described mostly with relation to the use of gaseous sulfur dioxide. Sulfur dioxide in solution in water may likewise be used, but this has the disadvantage, compared to gaseous sulfur dioxide, of involving constant introduction of additional liquid into the digester. To prevent this from overflowing the digester and from interfering with the accuracy of measurement of off-gas the liquid level inside the digester is watched in sight gauge 67 and it is necessary to continuously remove liquid from digester 4 to maintain a substantially uniform liquid level therein and a substantially uniform gas space above the liquid. When this operation is practiced, the excess liquid is withdrawn through conduit 68 in the side of the digester 4, this connection having a screened terminal 69, shielded with element 70 to minimize the withdrawal of ore particles, and the withdrawn liquid may then be forced by pump 15 through conduit 16 to filter 17 or it may be used directly as absorbent in absorber 52 and returned to digester 4.

For the purposes of this application for patent, sulfurous acid is regarded as a solution of sulfur dioxide in water.

When operating according to the embodiment of this invention that involves the use of a solution of sulfur dioxide in water rather than gaseous sulfur dioxide, it is quite practical to introduce the crushed or ground ore into the closed reaction vessel, pump in the solution of sulfur dioxide in water until the desired liquid level is reached in the said vessel, while agitating the whole, and then continue in the same manner as when a slurry of ore is initially charged to the reaction vessel and treated therein with a solution of sulfur dioxide in water.

What I claim is:

1. A process for the removal of carbonates from carbonate-containing ores which comprises: introducing a slurry of finely divided ore and water into a closed digestion chamber, introducing sulfur dioxide into the closed digestion chamber at a relatively uniform rate and there reacting it with the ore, permitting escape of gas from said digestion chamber whereby first a maximum and then a minimum rate of flow of said gas is achieved, metering the rate at which gas is discharged from the digestion chamber, discontinuing the introduction of sulfur dioxide into the digestion chamber when the rate at which gas is discharged from said chamber falls sharply to the said minimum value, and then separating the solids of the so-treated slurry from the attendant liquor.

2. A process for the removal of carbonates from carbonate-containing ores which comprises: introducing a slurry of finely divided ore and water into a closed digestion chamber, introducing sulfur dioxide into the said digestion chamber at a relatively uniform rate and there reacting it with the ore, permitting escape of gas from said digestion chamber whereby first a maximum and then a minimum rate of flow of said gas is achieved, metering the rate at which gas is discharged from said digestion chamber, discontinuing the introduction of sulfur dioxide into the digestion chamber substantially immediately after the ratio of the rate of gas discharged from the digestion chamber to the rate of introduction of sulfur dioxide thereto decreases to a point between about 80 percent and 50 percent of its maximum, and then separating the solids of the so-treated slurry from the attendant liquor.

3. A proces for the removal of carbonates from carbonate-containing pyrochlore ore which comprises: introducing a slurry of finely divided pyrochlore ore and water into a closed digestion chamber, introducing sulfur dioxide into the closed digestion chamber at a relatively uniform rate and there reacting it with the ore, permitting escape of gas from said digestion chamber whereby first a maximum and then a minimum rate of flow of said gas is achieved, metering the rate at which gas is discharged from the digestion chamber, discontinuing the introduction of sulfur dioxide into the digestion chamber when the rate at which gas is discharged from said chamber falls sharply to the said minimum value, and then separating the solids of the so-treated slurry from the attendant liquor.

4. A process for the removal of carbonates from carbonate-containing pyrochlore ore which comprises: introducing a slurry of finely divided pyrochlore ore and water into a closed digestion chamber, introducing sulfur dioxide into the said digestion chamber at a relatively uniform rate and there reacting it with the ore, permitting escape of gas from said digestion chamber whereby first a maximum and then a minimum rate of flow of said gas is achieved, metering the rate at which gas is discharged from said digestion chamber, discontinuing the introduction of sulfur dioxide into the digestion chamber substantially immediately after the ratio of the rate of gas discharged from the digestion chamber to the rate of introduction of sulfur dioxide thereto decreases to a point between about 80 percent and 50 percent of said maximum, and then separating the solids of the so-treated slurry from the attendant liquor.

5. A process for removal of carbonates from carbonate-containing ores which comprises: introducing a slurry of finely divided ore and water into a closed digestion chamber, introducing sulfur dioxide dissolved in water into the closed digestion chamber at a relatively uniform rate, withdrawing liquid from the closed digestion chamber at substantially the same rate at which the sulfur dioxide solution is charged thereto to maintain a substantially uniform liquid level in said digestion chamber, permitting escape of gas from said digestion chamber whereby first a maximum and then a minimum rate of flow of said gas is achieved, metering the rate at which gas is discharged from the digestion chamber, discontinuing the introduction of sulfur dioxide into the digestion chamber when the rate at which gas is discharged from said chamber falls sharply to the said minimum value, and then separating the solids of the so-treated slurry from the attendant liquor.

6. A process for removal of carbonates from carbonate-containing ores which comprises: introducing a slurry of finely divided ore and water into a closed digestion chamber, introducing sulfur dioxide dissolved in water into the closed digestion chamber at a relatively uniform rate, withdrawing liquid from the closed digestion chamber at substantially the same rate at which the sulfur dioxide solution is charged thereto to maintain a substantially uniform liquid level in said digestion chamber, permitting escape of gas from said digestion chamber whereby first a maximum and then a minimum rate of flow of said gas is achieved, metering the rate at which gas is discharged from the digestion chamber, discontinuing the introduction of sulfur dioxide into the digestion chamber substantially immediately after the ratio of the rate of gas discharged from the digestion chamber to the rate of introduction of sulfur dioxide thereto decreases to a point between about 80 percent and 50 percent of said maximum, and then separating the solids of the so-treated slurry from the attendant liquor.

7. A process for removal of carbonates from carbonate-containing pyrochlore ore which comprises: introducing a slurry of finely divided pyrochlore ore and water into a closed digestion chamber, introducing sulfur dioxide dissolved in water into the closed digestion chamber at a relatively uniform rate, withdrawing liquid from the closed digestion chamber at substantially the same rate at which the sulfur dioxide solution is charged thereto to maintain a substantially uniform liquid level in said digestion chamber, permitting escape of gas from said digestion chamber whereby first a maximum and then a minimum rate of flow of said gas is achieved, metering the rate at which gas is discharged from the digestion chamber, discontinuing the introduction of sulfur dioxide into the digestion chamber when the rate at which gas is discharged from said chamber falls sharply to the said minimum value, and then separating the solids of the so-treated slurry from the attentent liquor.

8. A process for removal of carbonates from carbonate-containing pyrochlore ore which comprises: introducing a slurry of finely divided pyrochlore ore and water into a closed digestion chamber, introducing sulfur dioxide dissolved in water into the closed digestion chamber at a relatively uniform rate, withdrawing liquid from the closed digestion chamber at substantially the same rate at which the sulfur dioxide solution is charged thereto to maintain a substantially uniform liquid level in said digestion chamber, permitting escape of gas from said digestion chamber whereby first a maximum and then a minimum rate of flow of said gas is achieved, metering the rate at which gas is discharged from the digestion chamber, discontinuing the introduction of sulfur dioxide into the digestion chamber substantially immediately after the ratio of the rate of gas discharged from the digestion chamber to the rate of introduction of sulfur dioxide thereto decreases to a point between about 80 percent and 50 percent of said maximum, and then separating the solids of the so-treated slurry from the attendant liquor.

References Cited in the file of this patent
UNITED STATES PATENTS 1,959,448     Staufer et al. _____ May 22, 1934